(No Model.)

C. A. CASE.
REVERSING AND BRAKE MECHANISM FOR HOISTING APPARATUS.

No. 448,909. Patented Mar. 24, 1891.

WITNESSES:
George Baumann
John Revell

INVENTOR
Charles A. Case
BY Howson and Howson
his ATTORNEYS (No Model.)  2 Sheets—Sheet 2.
C. A. CASE.
REVERSING AND BRAKE MECHANISM FOR HOISTING APPARATUS.
No. 448,909. Patented Mar. 24, 1891.

WITNESSES:
George Baumann
John Revell

INVENTOR
Charles A. Case
By Howson and Howson
his ATTORNEYS ns.
UNITED STATES PATENT OFFICE.

CHARLES A. CASE, OF NEW YORK, N. Y.

REVERSING AND BRAKE MECHANISM FOR HOISTING APPARATUS.

SPECIFICATION forming part of Letters Patent No. 448,909, dated March 24, 1891.

Application filed May 22, 1890. Serial No. 352,762. (No model.)

*To all whom it may concern:*

Be it known that I, CHARLES A. CASE, a citizen of the United States, and a resident of New York city, New York, have invented Improved Reversing and Brake Mechanism for Hoisting Apparatus, of which the following is a specification.

My invention consists of an improved construction of reversing-gear and brake mechanism for hoisting apparatus.

Figure 1:
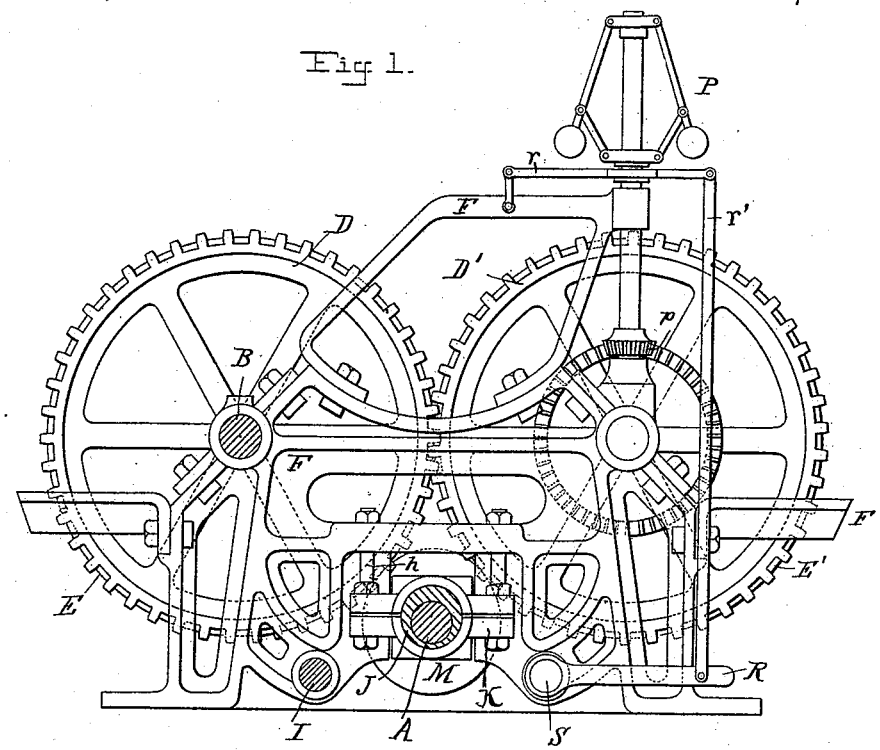
Figure 2:
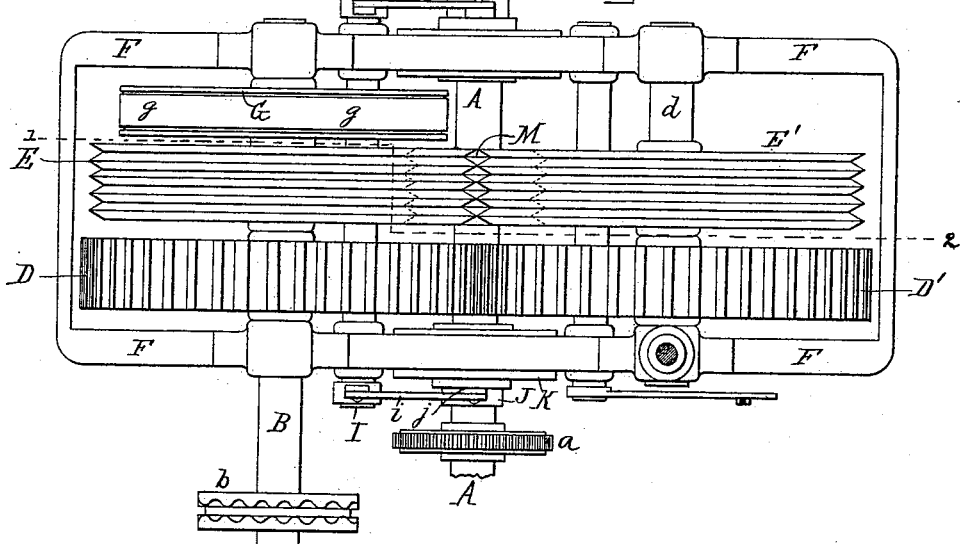
Figure 3:
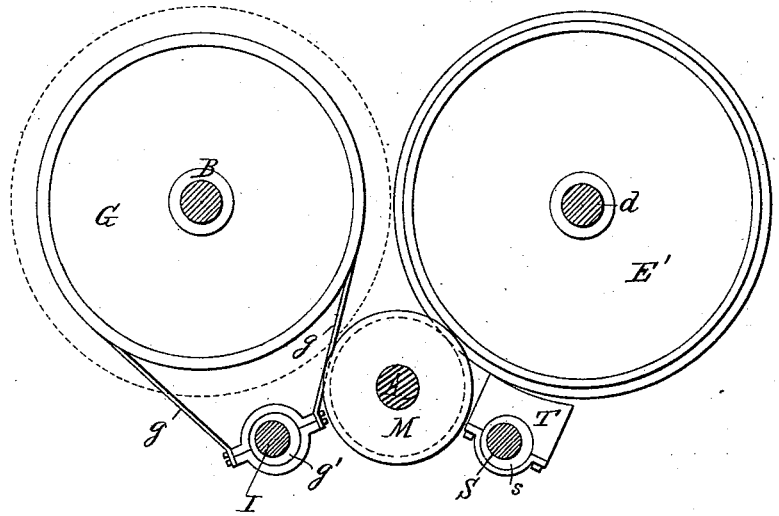
Figure 4:
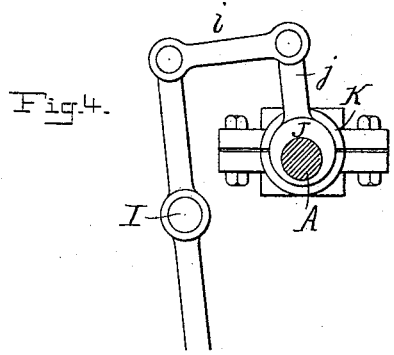

In the accompanying drawings, Figure 1 is a side elevation of the apparatus. Fig. 2 is a plan view with the centrifugal governor and its upper bearing removed. Fig. 3 is a vertical section on the line 1 2, Fig. 2; and Fig. 4 is a side view of a part.

A and B are the two main shafts, and power is applied to one of these shafts—say the shaft A—to rotate it continually in one direction, while the other shaft B is to be driven from the power-shaft in either direction, according to the position to which the reversing mechanism may be moved. I have shown the shaft A as provided with a sprocket or gear wheel $a$, to which rotary motion is communicated from the motive-power engine, and I have shown the driven shaft B as provided with a chain-wheel $b$, around which is passed a hoisting-chain, or this shaft B may be geared up to other shafting, as desired. It will also be understood that power may be applied to the shaft B to be transmitted through the reversing mechanism to the shaft A; but for convenience of description I will call the shaft A the "power-shaft" and the shaft B the "driven shaft." This shaft B is mounted in fixed bearings in the frame F and carries a gear-wheel D, a grooved friction-wheel E, and a brake-wheel G. The gear-wheel D of the shaft B meshes into a corresponding gear-wheel D' on a shaft $d$, which is mounted to turn in bearings in the fixed frame. This shaft $d$ also carries a grooved friction-wheel E', similar to but not in contact with the grooved friction-wheel E on the driven shaft B.

The power-shaft A is mounted to turn in adjustable bearings J, which are in turn mounted eccentrically in bearings K, carried by the opposite side frames of the apparatus. This shaft A carries a small friction-wheel M, grooved to correspond with the grooves in the two friction-wheels E E', which are geared together indirectly through the medium of the wheels D and D'.

The adjustable eccentric-bearings J for the shaft A are provided with levers $j$, by which they can be adjusted in a rotary direction within the fixed bearings K, and owing to this eccentricity of the bearings J the grooved friction-wheel M can be brought into frictional contact with either the friction-wheel E or the friction-wheel E', according to the direction in which the bearings J are turned by their levers. In this way the rotary movement imparted to the driven shaft can be readily reversed, or it may be stopped when the driving friction-wheel M is left midway out of contact with either wheel E E'.

In order that the eccentric-bearings J at the opposite sides of the frame may be reversed together and coincidently, I connect the levers $j$ by links $i$ to arms on a cross-shaft I, which is mounted in suitable bearings in the side frames and which is provided with a suitable handle under the control of the operator, Fig. 4. I also utilize this cross-shaft I to control the brake-strap $g$, which passes around the brake-wheel G on the driven shaft B. For this purpose the cross-shaft I carries an eccentric $g'$, and to the collar of this eccentric are connected the opposite ends of the brake-strap $g$. This eccentric is set in such a position that the brake-strap will be free from the brake-wheel when the cross-shaft I is turned to move the eccentric-bearings J to bring the driving-wheel M into contact with either of the friction-wheels E or E'; but as the friction-wheel M is moved away from either of the wheels E or E' and toward the central position out of contact with either of the said wheels E or E' the eccentric $g'$ will be moved to cause the strap $g$ to bind on the brake-pulley G and stop the rotation of the driven shaft.

I also prefer to provide, in connection with the shaft $d$, an automatic brake mechanism to prevent the apparatus from being driven too fast. For this purpose I provide a centrifugal governor P, mounted on a vertical shaft turning in bearings in the frame and driven by bevel-gearing $p$ from the shaft $d$. This centrifugal governor acts upon an arm $r$, connected through a link $r'$ to an arm R on a cross-shaft S, mounted in bearings in the side frames. This cross-shaft S carries on an eccentric or cam *s* a brake-shoe T, having on its curved face grooves to correspond with the grooves in the periphery of the friction-wheel E′. This brake-shoe and its eccentric or cam *s* are so set that when the centrifugal governor is driven at too high a speed the brake-shoe will be pressed more or less forcibly against the periphery of the grooved wheel E′ through the medium of the arm *r*, link *r′*, arm R, shaft S, and its eccentric or cam.

It is preferable to make the stationary bearings K of the eccentric-bearings J adjustable vertically by means of bolts *h* and suitable adjusting and set nuts.

I claim as my invention—

1. The combination of a frame and a power-shaft carrying a friction-wheel with two friction-wheels indirectly geared to each other through intermediate gear-wheels, and adjustable eccentric-bearings for the power-shaft, whereby the friction-wheel on the power-shaft may be brought into driving contact with either of the geared friction-wheels, substantially as described.

2. The combination of a frame and a power-shaft carrying a friction-wheel with two friction-wheels geared together indirectly through intermediate gear-wheels, eccentric-bearings for the power-shaft, and stationary but adjustable bearings for the said eccentric-bearings, substantially as described.

3. The combination of a frame and a power-shaft carrying a friction-wheel with two friction-wheels, a brake-wheel for one of the latter, gear-wheels connecting said two friction-wheels, eccentric-bearings for the power-shaft, and levers controlling the brake for the brake-wheel and the said eccentric-bearings, substantially as described, whereby the driving friction-wheel can be moved into and out of contact with either of the geared friction-wheels, and the brake will be applied to the brake-wheel as the driving friction-wheel is disengaged from either of the geared friction-wheels.

4. The combination of a frame and a power-shaft carrying a friction-wheel with two friction-wheels geared together indirectly through intermediate gear-wheels and mounted to turn in bearings in the frame, a brake-wheel for one of the friction-wheels, a brake-strap for the latter, and a cross-shaft having an eccentric to apply the brake-strap to the wheel and controlling the adjustment of the eccentric-bearings for the power-shaft to throw the driving friction-wheel into or out of contact with either of the geared friction-wheels, substantially as described.

5. The combination of a power-shaft having a friction-wheel and eccentric-bearings for the shaft with two friction-wheels, with either of which the driving friction-wheel may be brought into contact, a cross-shaft having a brake-shoe for one of the geared friction-wheels, and a centrifugal governor controlling the said brake-shoe, all substantially as described.

In testimony whereof I have signed my name to this specification in the presence of two subscribing witnesses.

CHARLES A. CASE.

Witnesses:
EDITH J. GRISWOLD,
HUBERT HOWSON.